Patented Mar. 7, 1950

2,499,797

UNITED STATES PATENT OFFICE 2,499,797

5-ALKOXY SEBACIC ACID AND PROCESS

Clement W. Theobald, Wilmington, Del., assignor to E. I. du Pont de Nemours & Company, Wilmington, Del., a corporation of Delaware No Drawing. Application February 23, 1949, Serial No. 77,995

4 Claims. (Cl. 260—535)

This invention relates to new chemical compounds, and more particularly to aliphatic dibasic acids and to methods for their preparation.

The long carbon chain between the carboxyl groups in sebacic acid makes this acid highly useful as an intermediate for the synthesis of polyesters and polyamides, imparting to such polymers improved toughness, flexibility, and increased water-resistance. The only practical method now available for the commercial production of sebacic acid is the alkaline oxidation of castor oil. Research has led to the belief that the properties of polymers made from sebacic acid would be further improved by having ether groups present on the carbon chain between the carboxyl groups but such acids have not hitherto been known and no methods for their preparation have been available.

This invention has as an object the production of new 5-alkoxy substituted sebacic acids. Further objects reside in methods for obtaining these acids and for the preparation of intermediates used in their synthesis.

The new 5-alkoxysebacic acids of this invention are obtained by nitrosating a 6-alkoxycyclodecanone, hydrolyzing the resulting oxime, and then oxidizing the resulting cyclic 6-alkoxydiketone with hydrogen peroxide.

An economical and practical method for carrying out the reaction for the production of the present 5-alkoxysebacic acids consists in charging a reactor with 2.68 grams of 6-methoxycyclodecanone in solution in 5 cc. of anhydrous methanol, containing 0.5 cc. of concentrated hydrochloric acid, adding dropwise, at 0° C., a solution of 3 grams of commercial ethyl nitrite in 10 cc. of absolute methanol, maintaining the mixture at 0° C. for one hour, neutralizing the acid with 0.5 cc. of concentrated ammonium hydroxide, and then evaporating the reaction mixture to dryness under reduced pressure. The residue exhibits the characteristic, grass-green color of oximino ketones when an alcoholic solution is treated with copper acetate solution and is soluble in dilute sodium hydroxide, with the production of a yellow color.

The above residue (4.1 g.) was dissolved in methylene chloride, washed with water to remove the ammonium chloride and the oxime was isolated by evaporation of the extracting solvent. A 2.3 gram portion of this residue was treated with 35 grams of 30% sulfuric acid on a steam bath (ca. 95° C.) for 15 minutes and then 10 cc. of 30% hydrogen peroxide was added slowly at the same temperature of approximately 95° C. The water insoluble, straw-colored diketone liberated upon hydrolysis dissolved completely upon treatment with the hydrogen peroxide, giving an opalescent solution. Upon cooling, the 5-methoxysebacic acid was isolated by extraction and evaporation of the extract. The initially produced oil crystallized on standing and melted sharply at 64° C., after washing the crystals with a little petroleum ether and drying on a clay plate.

Anal. calculated for $C_{11}H_{20}O_5$: C, 56.76; H, 8.68; neutral equiv., 116.14. Found: C, 57.00, 56.91; H, 8.89, 8.68; neutral equiv., 121.9.

From the solution remaining after determination of the neutral equivalent, a p-bromophenacyl ester was prepared, which melted at 85–87° C. An alcoholic solution of this derivative gave no precipitate even on prolonged boiling with alcoholic silver nitrate.

Anal. calculated for $C_{27}H_{30}O_7Br_2$: C, 51.77; H, 4.83. Found: C, 51.68, 51.39; H, 4.95, 4.92.

The 6-methoxycyclodecanone used in the above example can be prepared as follows:

A solution of 34 grams of trans-4a-decahydronaphthyl hydrogen peroxide and 200 cc. of 1 N hydrogen chloride in anhydrous methanol was warmed gently upon a steam bath whereupon a vigorous reaction set in causing spontaneous ebullition for about 5 minutes. After the initial reaction had subsided, the reaction mixture was refluxed for an additional 25 minutes, whereupon titration of an aliquot portion indicated that practically no peroxide remained. The solvent was removed by passage through a steam-heated stripping still and the residue was dried and flash distilled, giving 28.5 grams of material boiling in the range 50° to 110° C. at approximately 1 mm. Fractionation of this distillate gave approximately 17.5 grams of 6-methoxycyclodecanone. The identity of the material was determined by the preparation of an oxime which melted at 84° to 85° C. and was not depressed in melting point when mixed with an authentic sample of 6-methoxycyclodecanone oxime.

The 6-methoxycyclodecanone used in the example can be replaced by any of the 6-alkoxycyclodecanones in which the alkoxy group contains from one to eighteen carbon atoms. Further examples of compounds of this kind that can be used in the practice of the present invention are 6-ethoxycyclodecanone, 6-isopropyloxycyclodecanone, 6-butyroxycyclodecanone, 6-octyloxycyclodecanone, 6-dodecyloxycyclodecanone, 6-octadecyloxycyclodecanone, 3-methyl - 6 - methoxycyclodecanone, and the like. From these there are obtained 5-ethoxysebacic acid, 5-isopropyloxysebacic acid, 5-butyroxysebacic acid, 5-octyloxysebacic acid, 5-dodecyloxysebacic acid, 5-octadecyloxysebacic acid, etc. Any of the compounds conventionally used in nitrosating reactions, namely, nitrous acid and compounds yielding nitrous acids under acid conditions, can be used in the nitrosation of the 6-alkoxycyclodecanone. The alkyl nitrites in which the alkyl group contains from 1 to 18, and preferably from 1 to 5, carbon atoms, for example the methyl, ethyl, propyl, amyl, octyl dodecyl, and octadecyl nitrites, are the compounds most usually used, although sodium or other alkali metal nitrites will serve as well.

In the nitrosation, optimum results are obtained when substantially the theoretic amount of the nitrosating compound is used for the formation of the monoxime of the 6-alkoxycyclodecanone. As the quantity of the nitrosating agent is increased the amount of di- and higher oximes formed become larger, which correspondingly reduces the yield of the desired 5-alkoxysebacic acid. Lesser amounts of the nitrosating compound likewise operates to reduce the yield through non-utilization of all the available 6-alkoxycyclodecanone.

The nitrosation may be carried out at temperatures of from 0° to 50° C. Since satisfactory reaction rates and yield of desired monoxime are obtained at temperatures of from 20° to 40° C., temperatures in this range are generally used.

The nitrosation is usually carried out under acid conditions, the amount of acid used is generally from 1 to 10% on the weight of the alkyl nitrite. The acid can be a mineral acid such as hydrochloric, phosphoric, and the like or an organic acid. Alkaline conditions can also be used, for example, using catalytic amounts of an alkali metal alcoholate, in accordance with known nitrosating procedures employing an alkyl nitrite as the nitrosating agent.

The nitrosation may be carried out in the presence of any organic liquid which is a solvent for the alkyl nitrite and 6-alkoxycyclodecanone and which is unreactive with the alkyl nitrite and ketone. Suitable solvents are ethers, aromatic hydrocarbons, alcohols, especially primary aliphatic monohydric alcohols, and the like.

The hydrolysis of the monoxime of the 6-alkoxycyclodecanone can be carried out at any temperature in the range of 20° to 120° C. Generally, however, temperatures of from 80 to 105° C. are employed. In the hydrolysis any suitable strong mineral acid, e. g., hydrochloric, sulfuric, phosphoric, and the like may be used. Usually the acid employed is of 10 to 50% concentration and the amount used should be at least one mole per mole of the monoxime of 6-alkoxycyclodecanone present in the reaction mixture.

In effecting the oxidation of the cyclic diketone formed in the hydrolysis step at least two moles of hydrogen peroxide per mole of cyclic diketone should be used. The oxidation can be carried out at 70° to 120° C., but since good reaction rates and good yields of desired 5-alkoxysebacic acid are obtained at 90° to 105° C., this is the range generally used. In order to minimize initiation of uncontrolled oxidation reactions, the usual way for effecting the reaction is by adding the hydrogen peroxide portion-wise to the heated cyclic diketone. A hydrogen peroxide solution containing acid in from 10% to 50% concentration by weight is usually used.

In the preparation of the 6-alkoxycyclodecanone, decahydronaphthyl hydrogen peroxide or one of its esters such as the benzoate or acetate is reacted with an acidulated monohydric alcohol, e. g., acidulated methanol, ethanol, secondary propyl alcohol, etc. Generally, methanol containing 5% concentrated hydrochloric acid is employed. Alternatively anhydrous methanol containing dissolved anhydrous hydrogen chloride can be used. The amount of alcohol is at least molar equivalent to the decahydronaphthyl hydrogen peroxide. It is desirable, however, to use a large excess of the alcohol in order that it may function not only as a reactant but also as a reaction medium and as a heat of reaction dissipating medium. When decahydronaphthyl hydrogen peroxide or one of its esters is reacted with a secondary or tertiary alcohol, the reaction product contains a large proportion of 6-hydroxycyclodecanone as well as the ether corresponding to the alcohol.

The reaction between the decahydronaphthyl hydrogen peroxide and the acidulated alcohol may be carried out at temperatures of from 20° to 60° C. for from 3 minutes to 3 hours, depending upon the temperature employed. Generally, however, temperatures of from 30° to 50° C. are used, and under these conditions, for from 20 to 40 minutes.

The 5-alkoxysebasic acids of this invention are usedful as intermediates for the preparation of polyamides, polyesters, etc.

As many apparently widely different embodiments of this invention may be made without departing from the spirit and scope thereof, it is to be understood that I do not limit myself to the specific embodiments thereof except as defined in the appended claims.

I claim:

1. A 5-alkoxysebacic acid.

2. 5-Methoxysebacic acid.

3. A process for obtaining a 5-alkoxysebacic acid which comprises nitrosating a 6-alkoxycyclodecanone, hydrolyzing the oxime obtained, oxidizing the resulting 6-alkoxy cyclic diketone, and isolating the 5-alkoxysebacic acid thus obtained.

4. A process for obtaining a 5-alkoxysebacic acid which comprises nitrosating at a temperature of from 0° C. to 50° C. a 6-alkoxycyclodecanone, hydrolyzing the mono-oxime obtained to the 6-alkoxy cyclic diketone at a temperature of 20° C. to 120° C., oxidizing the resulting 6-alkoxy cyclic diketone at a temperature of 70° C. to 120° C. with acidulated hydrogen peroxide in amount of at least two moles per mole of said diketone, and then isolating the 5-alkoxysebacic acid formed.

CLEMENT W. THEOBALD.

REFERENCES CITED

The following references are of record in the file of this patent:

UNITED STATES PATENTS

| Number | Name | Date |
|---|---|---|
| 2,428,955 | Baker et al. | Oct. 14, 1947 |

OTHER REFERENCES

Hodes, Chem. Abstracts, vol. 12, p. 633 (1918).